United States Patent [19]
Yamaji et al.

[11] Patent Number: 5,708,745
[45] Date of Patent: Jan. 13, 1998

[54] DEVICE FOR PREVENTING LASER BEAM LEAKAGE

[75] Inventors: Shigeki Yamaji; Shin Watanabe; Masatomo Ohta; Hiroyuki Abe; Katsumi Kanasaki; Masahiro Haga, all of Kawasaki; Akira Sawada, Osaka; Manabu Matsumoto, Kawasaki, all of Japan

[73] Assignee: Fujitsu Limited, Kawasaki, Japan

[21] Appl. No.: 498,441

[22] Filed: Jul. 5, 1995

[30] Foreign Application Priority Data

Oct. 20, 1994 [JP] Japan ................... 6-254933

[51] Int. Cl.[6] ........................................... G02B 6/42
[52] U.S. Cl. .................. 385/92; 385/53; 385/139; 372/33
[58] Field of Search ................... 385/88–94, 134, 385/139, 147, 53, 76, 77, 78; 372/33

[56] References Cited

U.S. PATENT DOCUMENTS

| | | | |
|---|---|---|---|
| 4,640,575 | 2/1987 | Dumas | 385/134 |
| 4,767,179 | 8/1988 | Sampson et al. | 385/93 |
| 5,029,970 | 7/1991 | Hengst et al. | 385/88 |
| 5,104,242 | 4/1992 | Ishikawa | 385/53 |
| 5,274,722 | 12/1993 | Saitoh et al. | 385/78 |
| 5,348,487 | 9/1994 | Marazzi et al. | 385/78 X |
| 5,363,460 | 11/1994 | Marazzi et al. | 385/77 X |
| 5,452,391 | 9/1995 | Chou et al. | 385/92 |
| 5,570,445 | 10/1996 | Chou et al. | 385/92 |

FOREIGN PATENT DOCUMENTS

| | | |
|---|---|---|
| 56-59211 | 5/1981 | Japan . |
| 56-59212 | 5/1981 | Japan . |
| 56-151909 | 11/1981 | Japan . |
| 57-158606 | 9/1982 | Japan . |
| 60-207106 | 10/1985 | Japan . |
| 63-307408 | 12/1988 | Japan . |
| 2-208609 | 8/1990 | Japan . |
| 3-39912 | 2/1991 | Japan . |

*Primary Examiner*—John D. Lee
*Attorney, Agent, or Firm*—Staas & Halsey

[57] ABSTRACT

A device for preventing laser beam leakage, which excludes a danger that a laser beam emitted from a laser source directly attacks eyes of an operator when an external connector is connected to or disconnected from an internal connector, aiming at being inexpensive and excellent in operability, and having a high safety. When the external connector has been removed from the optical transmission apparatus, a pair of movable shield plates are constantly urged in respective directions for closing a receiving opening of the apparatus to bring joining portions of the movable shield plates into close contact with each other, thereby preventing dust from entering the inside of the apparatus and the laser beam from being leaked. Further, a limit switch is provided, which stops delivering an ON signal to an E/O laser module when the external connector is pulled out of the optical transmission apparatus, whereby the E/O laser beam stops supply of the laser beam, thereby bringing into effect a perfect measure for protection of the eyes of the operation from the laser beam.

12 Claims, 13 Drawing Sheets

DEVICE FOR PREVENTING LASER BEAM LEAKAGE

BACKGROUND OF THE INVENTION

1. Field of the Invention

This invention relates to a device for preventing laser beam leakage, which is provided for a laser beam transmission apparatus in which an external connector is connected to an internal connector, and more particularly to a device for excluding a danger that a laser beam emitted from a laser source directly attacks eyes of an operator when the external connector is connected to or disconnected from the internal connector.

2 Description of the Related Art

Recently, with the development of the fiber-optics communication, more and more photoelectric converters are used in terminal units of subscribers. On the other hand, a laser beam used for the fiber-optics communication may cause a disorder or loss of eyesight when it directly irradiates a human body. To avoid such a danger, it is required to provide a photoelectric converter equipped with means of sufficient protection of the human body from exposure to the laser beam.

FIG. 7 shows a first example of a conventional device for preventing laser beam leakage. In FIG. 7, a photoelectric converter 101 for a terminal unit of a subscriber receives an optical signal at an optical signal connector 102, converts the received optical signal into an electric signal, and delivers the resulting electric signal to the terminal unit, not shown, of the subscriber via an electric signal connector 103, or conversely converts an electric signal from the terminal unit of the subscriber into an optical signal, and delivers the optical signal toward an exchange. The optical signal connector 102 is connected to an external optical cable, not shown. When the cable has been disconnected, dust-proof caps 104, 105 are fit in the optical signal connector 102 thereby preventing dust from depositing on the optical signal connector 102, and a laser beam from being emitted out therefrom to directly irradiate eyes of a human body. FIG. 8 shows a state of the photoelectric converter 101 in which the dust-proof caps 104, 105 are fit in the optical signal connector 102.

However, the first example of the conventional device is constructed such that the dust-proof caps 104,105 are removed separately from the optical signal connector 102, and hence are liable to be lost. In such a case, dust deposits on the optical signal connector 102. Further, when the dust-proof caps 104, 105 are removed, there is a danger that a laser beam directly irradiates the eyes of an operator. Taking such inconvenience into consideration, a second example of the conventional device shown in FIG. 9, and a third example of the same shown in FIG. 12 are contemplated.

According to the second example of the conventional device shown in FIG. 9, an optical adapter 107 is provided within an optical transmission apparatus, not shown. The optical adapter 107 carries out trunk connection between an external optical cable 108 and an internal optical cable 109 (see FIG. 10). The internal optical cable 109 is connected to a laser beam generator, not shown, within the optical transmission apparatus. An opening 107a of the optical adapter 107, into which is inserted an external connector 110 fit on one end of the external optical cable 108, is provided with a movable shield plate 107b for opening and closing the opening 107a. Similarly, an opening 107c (see FIG. 11) of the optical adapter 107, into which is inserted an internal connector 111 fit on one end of the internal optical cable 109, is provided with a movable shield plate 107d for opening and closing the opening 107c. In the center of a section of the optical adapter 107, there is arranged an adapter 107e for optically connecting the external connector 110 and the internal connector 111. FIG. 10 shows a state of the optical adapter 107 in which the external connector 110 and the internal connector 111 are connected to each other, and FIG. 11 shows the internal construction of the optical adapter 107.

As shown in FIG. 11, the movable shield plates 107b, 107d have respective one ends retained by the optical adapter 107 such that they can be rotated about retaining portions, and are urged to respective positions for closing the openings 107a, 107c, respectively. By inserting the external connector 110 and the internal connector 111 into the optical adapter 107, as shown in FIG. 10, the movable shield plates 107b, 107d are rotated in directions opposite to the urging directions. Therefore, when the external connector 110 has been removed from the optical adapter 107, the movable shield plate 107b covers the opening 107a of the optical adapter 107, thereby preventing dust from depositing on the optical adapter 107 and the laser begun from irradiating eyes of the operator.

According to the third example of the conventional device shown in FIG. 12, an external connector-fitting block 114 of an optical transmission apparatus 113 is provided with a movable shield plate 116 which can be moved in vertical directions 115. The operator lifts the movable shield plate 116 by hand, and inserts an external connector 117 (see FIG. 13) into the external connector-fitting block 114, whereby an external optical cable 118 is connected to an optical adapter, not shown, within the optical transmission apparatus 113. FIG. 13 shows a state of the apparatus 113 in which the external connector 117 is inserted.

In the third example of the device for preventing the laser beam leakage, when the external connector 117 has been removed from the optical transmission apparatus 113, the movable shield plate 116 moves downward by its own weight, to cover the external connector-fitting block 114, thereby preventing dust from entering the inside of the apparatus 113 and the laser beam from irradiating the eyes of the operator.

However, the second example of the conventional device for preventing the laser beam leakage shown in FIG. 9 is complicated in construction, and expensive. Particularly, the whole optical adapter 107 is required to be replaced when any of the adapter 107e, and the movable shield plates 107b, 107d becomes defective, since the movable shield plates 107b, 107d are provided on the optical adapter 107. This is uneconomical.

Further, in the case of the third example of the conventional device for preventing the laser beam leakage shown in FIG. 12, there is a fear that the eyes of the operator may be exposed to the laser beam when he lifts the movable shield plate 116 upward to insert the external connector 117 into the optical transmission apparatus 113. Further, when the external connector 117 has been removed from the optical transmission apparatus 113, there can be a case in which the movable shield plate 116 does not move downward by its own weight depending on the angle of installation of the optical transmission apparatus 113, which also results in a possibility of exposure of the eyes of the operator to the laser beam. Further, so long as the external connector 117 is inserted in the optical transmission apparatus 113, the movable shield plate 116 is in a projected position higher than the casing of the optical transmission apparatus 113, which makes it impossible to install a plurality of optical transmission apparatuses one upon another.

SUMMARY OF THE INVENTION

It is an object of the invention to provide a device for preventing laser beam leakage, which is inexpensive and excellent in operability, and has a high safety.

To achieve the above object, the invention provides a device for preventing laser beam leakage provided for a laser beam transmission apparatus in which an external connector is connected to an internal connector. The device for preventing laser beam leakage comprises: a receiving opening formed through a casing of the laser beam transmission apparatus for receiving the external connector therein; at least one pair of shield members having respective retaining portions fixed to the casing of the laser beam transmission apparatus such that the at least one pair of shield members extend from respective opposite sides of the receiving opening and being constantly urged in respective directions for closing the receiving opening; and joining portions provided on portions of the at least one pair of shield members opposite to the retaining portions thereof, for being brought into close contact with each other when the at least one pair of shield members are in respective positions for closing the receiving opening.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENT

Figure 1:
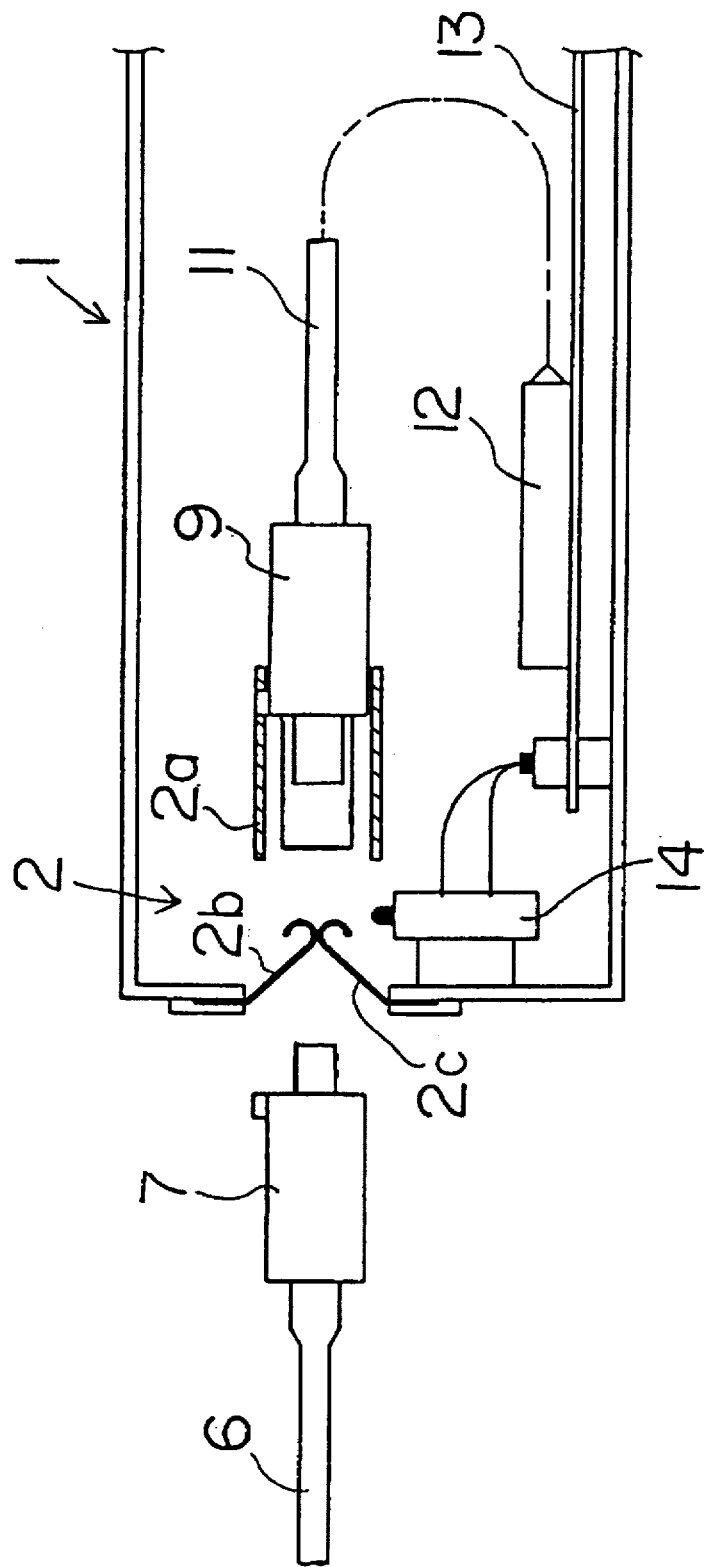
FIG. 1 is a sectional side elevation showing an external optical cable, an external connector, and part of an optical transmission apparatus containing an internal connector and an internal optical cable, for outputting an optical signal.

First, the principles of the present invention will be described with reference to FIG. 1 showing an embodiment of the invention.

As shown in FIG. 1, a device for preventing laser beam leakage according to the invention comprises a receiving opening formed through a casing of an optical transmission apparatus 1 for receiving an external connector 7 therein, at least one pair of shield members (2b, 2c) having respective retaining portions fixed to the casing of the optical transmission apparatus 1 such that the at least one pair of shield members (2b, 2c) extend from respective opposite sides of the receiving opening and are constantly urged in respective directions for closing the receiving opening, and joining portions provided on portions of the at least one pair of shield members (2b, 2c) opposite to the retaining portions thereof, for being brought into close contact with each other when the at least one pair of shield members (2b, 2c) are in respective positions for closing the receiving opening.

Further, the device for preventing the laser begun leakage further comprises a switch (14) which is operated by inserting the external connector 7 into the receiving opening to deliver an ON signal, laser beam supply means (12) for supplying a laser beam to an internal connector (9), and supply control means (12) connected to the switch (14) and the laser beam supply means (12) for causing the laser beam supply means (12) to supply the laser beam to the internal connector (9) so long as the supply control means (12) is supplied with the ON signal from the switch (14).

In the above construction, when the external connector 7 has been removed from the optical transmission apparatus 1, the at least one pair of shield members 2 are constantly urged in respective directions for closing the receiving opening, whereby the joining portions are brought into close contact with each other, thereby preventing deposition of dust and leakage of the laser beam.

Further, since the switch (14) and the supply control means (12) are provided, the switch (14) is operated to stop outputting the ON signal when the external connector 7 is removed from the optical transmission apparatus 1, so that the supply control means (12) causes the laser beam supply means (12) to stop the supply of the laser beam, thereby the eyes of an operator can be protected from the laser beam perfectly.

Next, an embodiment of the invention will be described in detail.

Figure 3:
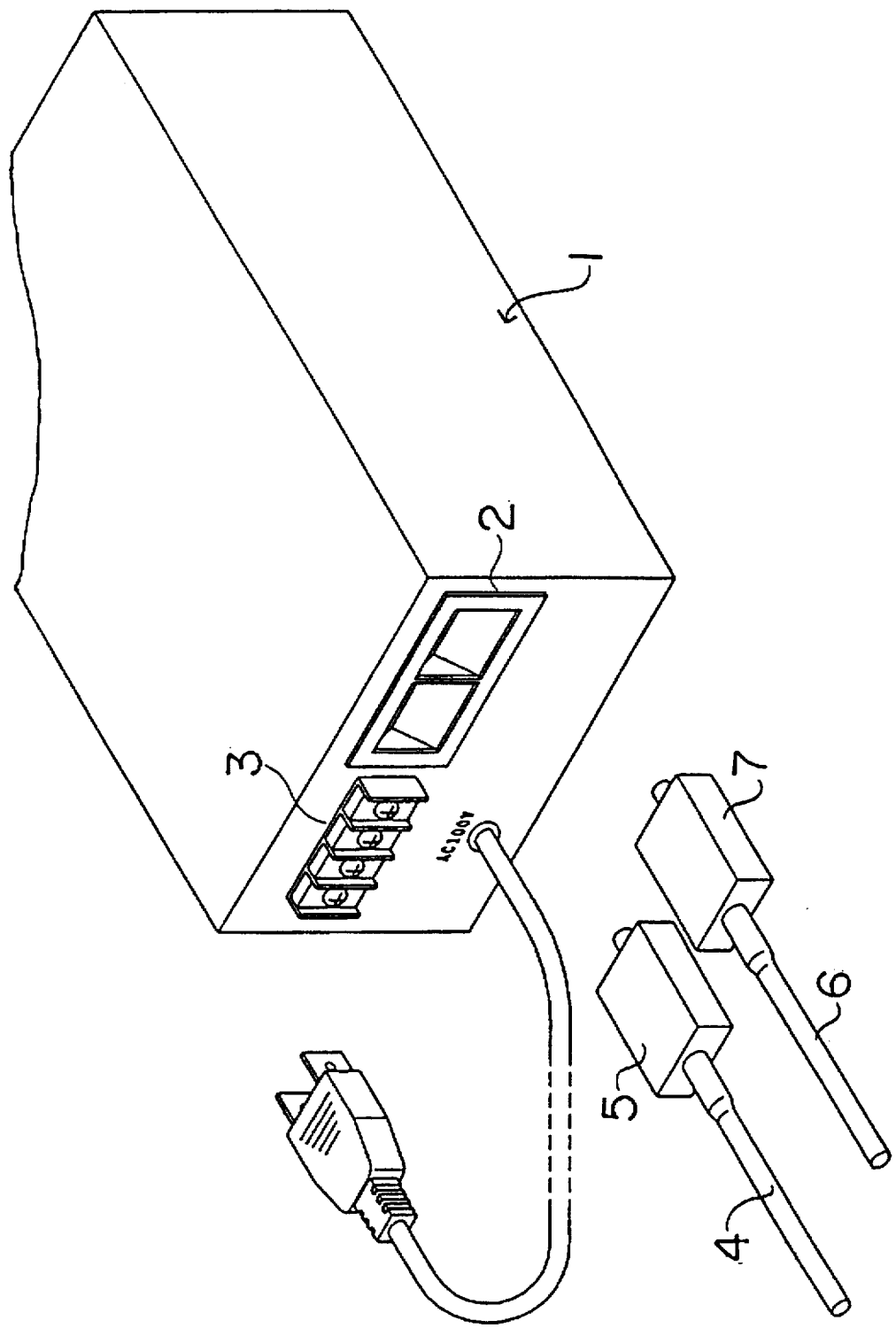
FIG. 3 is a perspective view showing an appearance of an optical transmission apparatus provided with a device for preventing laser beam leakage according to the present invention.

FIG. 3 shows an appearance of an optical transmission apparatus equipped with a device for preventing laser beam leakage according to the embodiment of the invention. The optical transmission apparatus 1 is an photoelectric converter for a terminal unit of a subscriber, which receives an optical signal supplied from an exchange, at an optical signal connector 2, converts the same into an electric signal, and delivers the resulting electric signal to the terminal unit of the subscriber, not shown, or conversely, receives an electric signal from the terminal unit of the subscriber at an electric signal connector 3, converts the electric signal into an optical signal, and delivers the resulting optical signal via the optical signal connector 2 toward the exchange. Connected to the optical signal connector 2 are an external connector 5 provided on one end of an external optical cable 4 for receiving the optical signal, and an external connector 7 provided on one end of an external optical cable 6 for sending out the optical signal.

Figure 4:
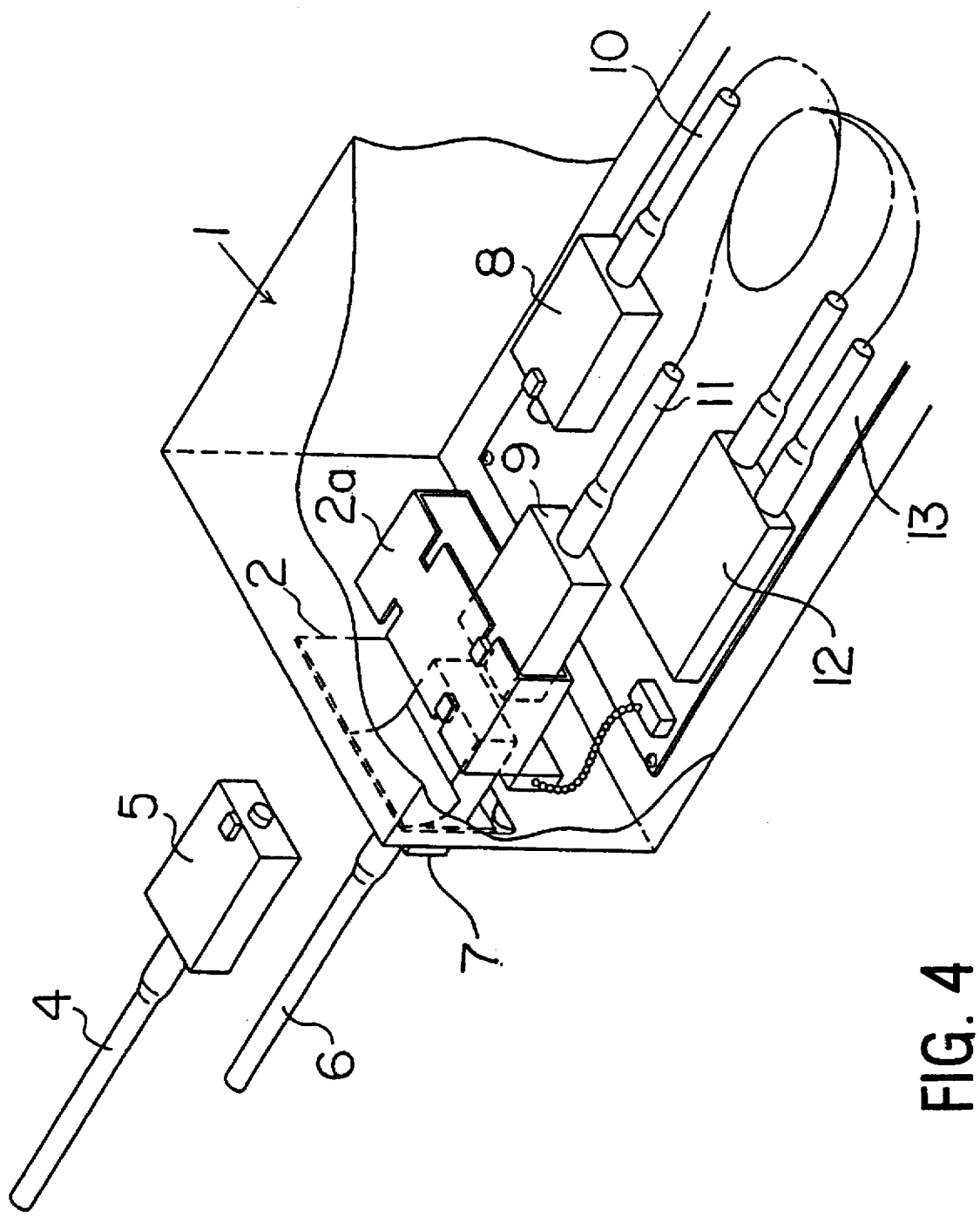
FIG. 4 is a perspective showing the inside of the optical transmission apparatus.

FIG. 4 is a perspective view showing the inside of the optical transmission apparatus 1. The optical signal connector 2 includes an optical adapter 2a having openings formed on an external side thereof for connection of the external connectors 5, 7 and openings formed on an internal side thereof for connection of internal connectors 8, 9. The optical signal connector 2a optically connects the external connectors 5, 7 with the internal connectors 8, 9, respectively. The internal connectors 8,9 are connected to an E/O laser module 12 via respective internal optical cables 10, 11. The E/O laser module 12 converts an optical signal received via the external optical cable 4, the external connector 5, the internal connector 8, and the internal optical cable 10, all associated with each other for receiving the optical signal, into an electric signal, and delivers the electric signal to the electric signal connector 3, or converts an electric signal received via the electric signal connector 3 into an optical signal of a laser beam, and outputs the optical signal via the internal optical cable 11, the internal connector 9, the external connector 7, and the external optical cable 6. The E/O laser module 12 is provided on a printed circuit board 13.

FIG. 1 is a sectional side elevation showing the external optical cable 6, the external connector 7, and part of the optical transmission apparatus 1 containing the external connector 7, internal connector 9 and the internal optical cable 11, for outputting the optical signal. The optical signal connector 2 is provided with the pair of movable shield plates 2b, 2c. More specifically, the movable shield plates 2b, 2c are each formed of a resilient material (e.g. a metal, such as phosphor bronze, and rubber), with one ends thereof being retained by the casing of the optical transmission apparatus 1, and the other open ends being formed with round turn portions. The movable shield plates 2b, 2c are urged by their own resilient force in respective directions for closing the receiving opening via which the external connector 7 is inserted, and held in respective positions in which the open ends thereof abut on each other. When the movable shield plates 2b, 2c are in these positions, they form curved surfaces which are indented inward of the casing of the optical transmission apparatus 1. Movable shield plates similar to the movable shield plates 2b, 2c are provided at the other receiving opening of the optical signal connector 2 via which the external connector 5 is inserted. They are constructed in the same manner as the movable shield plates 2b, 2c, and also have configurations shown in FIG. 5 and FIG. 6, referred to hereinafter.

Under the movable shield plate 2c, the limit switch 14 is provided on the casing of the optical transmission apparatus 1. The limit switch 14 is arranged in such a location that when the external connector 7 is inserted into the receiving opening to open the movable shield plate 2c, the movable shield plate 2c abuts on the limit switch 14, and so long as the external connector 7 is inserted in the receiving opening, the ON signal is delivered to the E/O laser module 12. The E/O laser module 12 delivers the laser beam into the internal optical cable 11 so long as it is supplied with the ON signal. In this connection, the limit switch is not provided at the receiving opening of the optical signal connector 2 via which is inserted the external connector 5 for receiving the optical signal.

Figure 2:
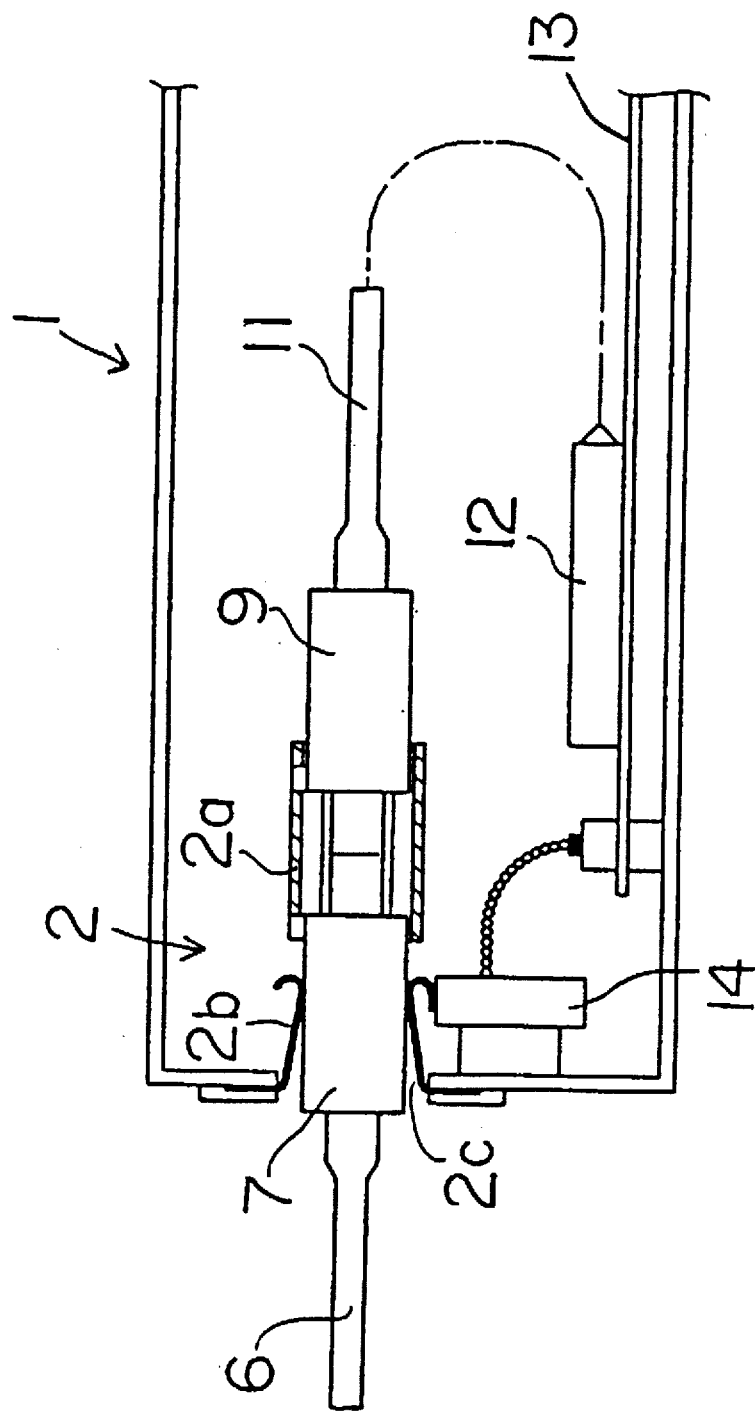
FIG. 2 is a sectional side elevation showing a state of the optical transmission apparatus having the external connector inserted therein for outputting the optical transmission.

In contrast to FIG. 1, in which the optical transmission apparatus 1 is shown in its state prior to receiving the output external connector 7 therein, FIG. 2 shows a state of the optical transmission apparatus 1 having the input external connector 7 for output inserted therein.

Figure 5:
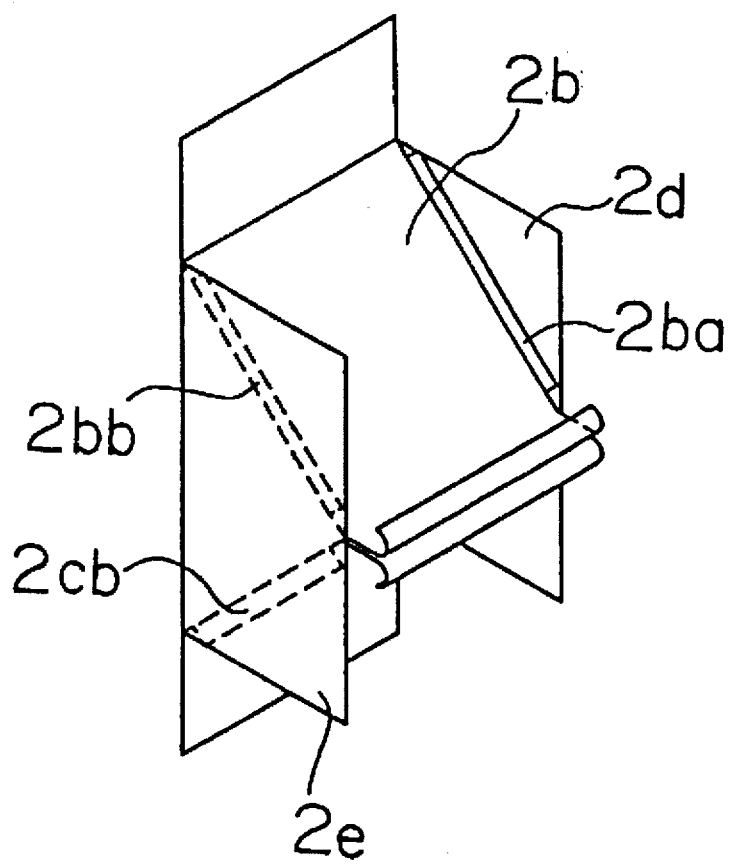
FIG. 5 is a perspective showing details of the arrangement of movable shield plates.
Figure 6:
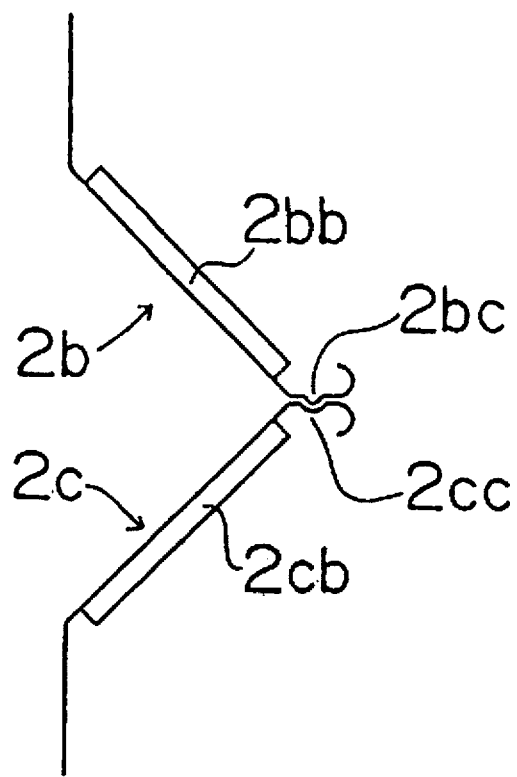
FIG. 6 is a side elevation showing details of the arrangement of the movable shield plates.
Figure 7:
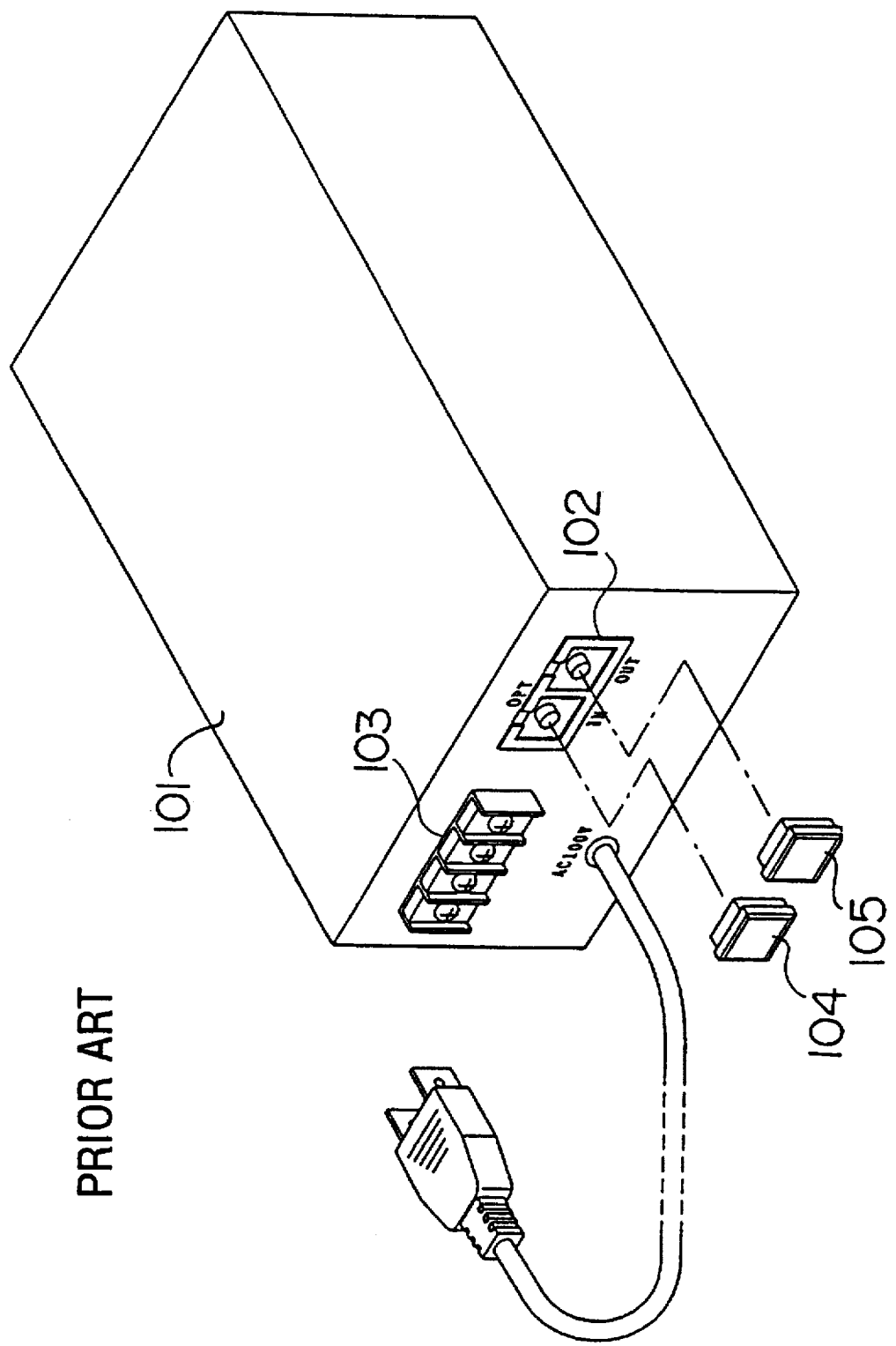
FIG. 7 is a perspective view showing an appearance of a first example of a conventional device for preventing laser beam leakage.
Figure 8:
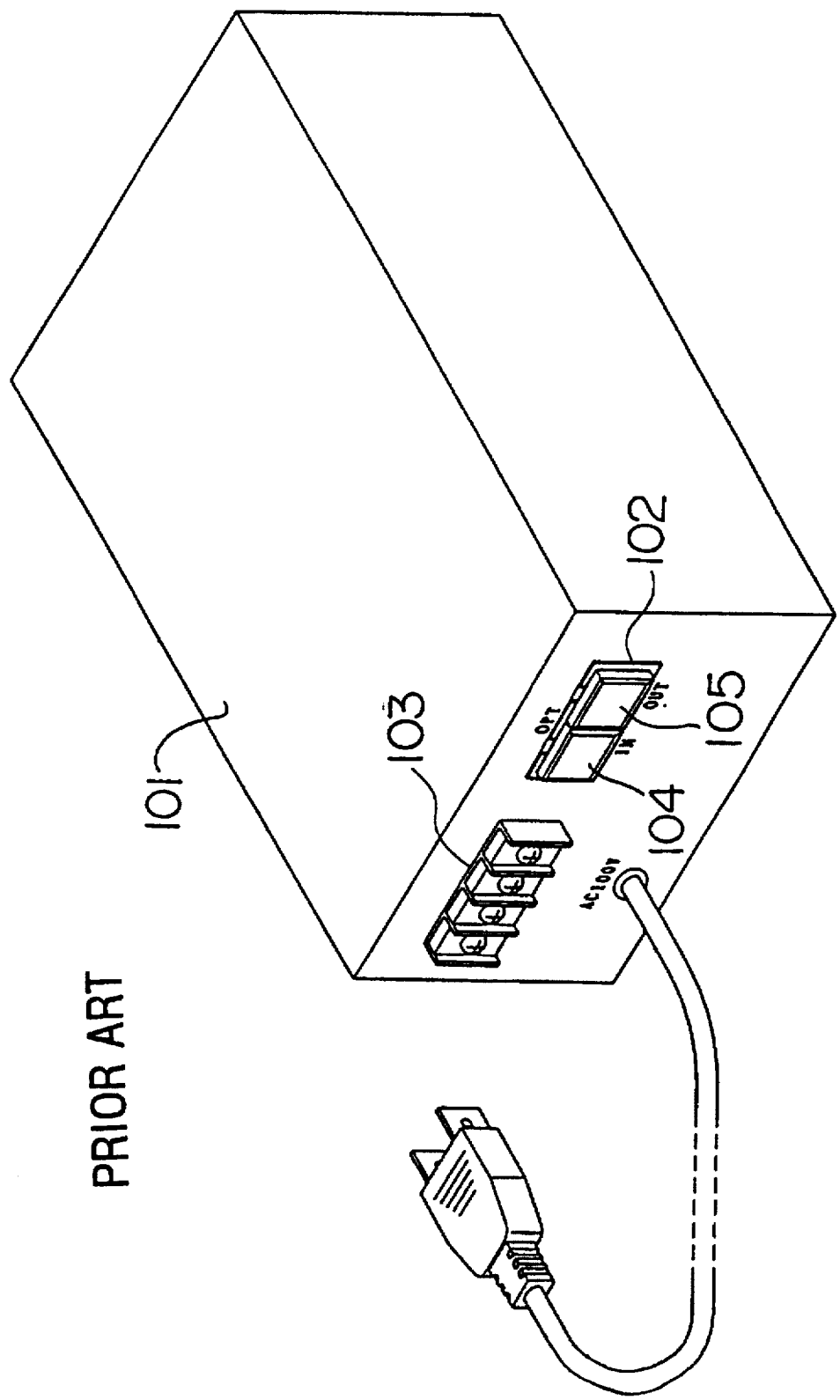
FIG. 8 is a perspective view showing a state of the first example of the conventional device for preventing laser beam leakage in which dust-proof caps are fit in an optical signal connector.
Figure 9:
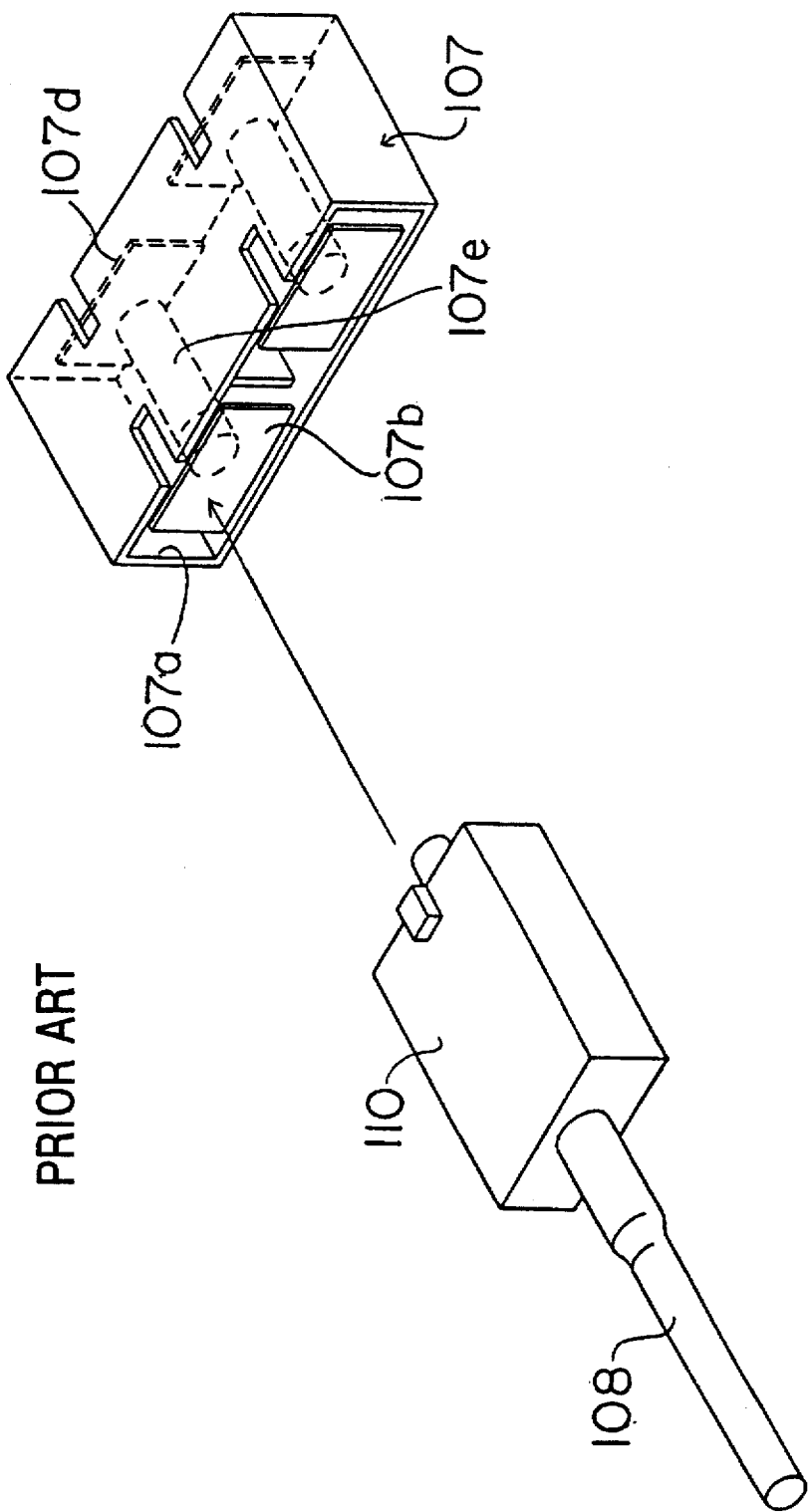
FIG. 9 is an exploded view showing a second example of the conventional device for preventing laser beam leakage.
Figure 10:
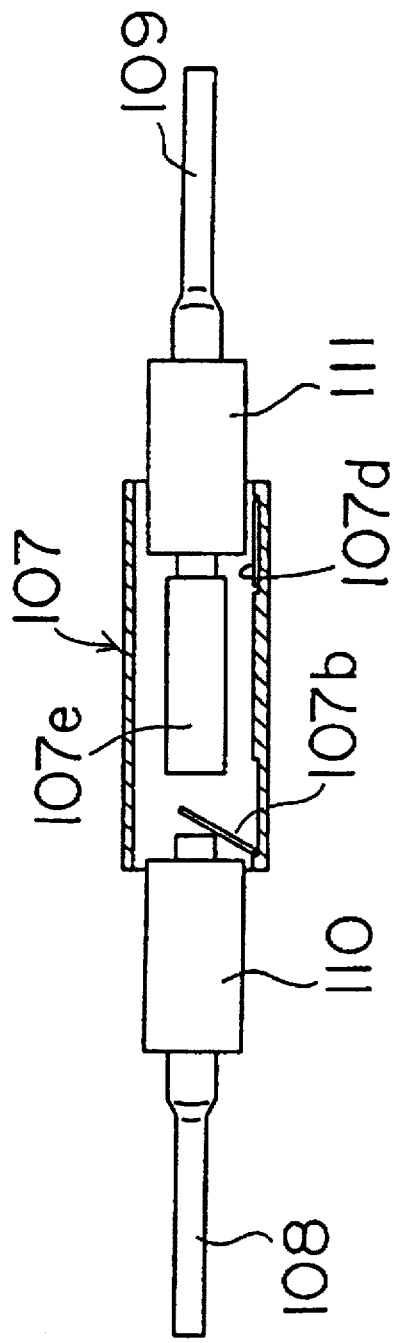
FIG. 10 is a sectional side elevation showing the second example of the conventional device for preventing laser beam leakage.
Figure 11:
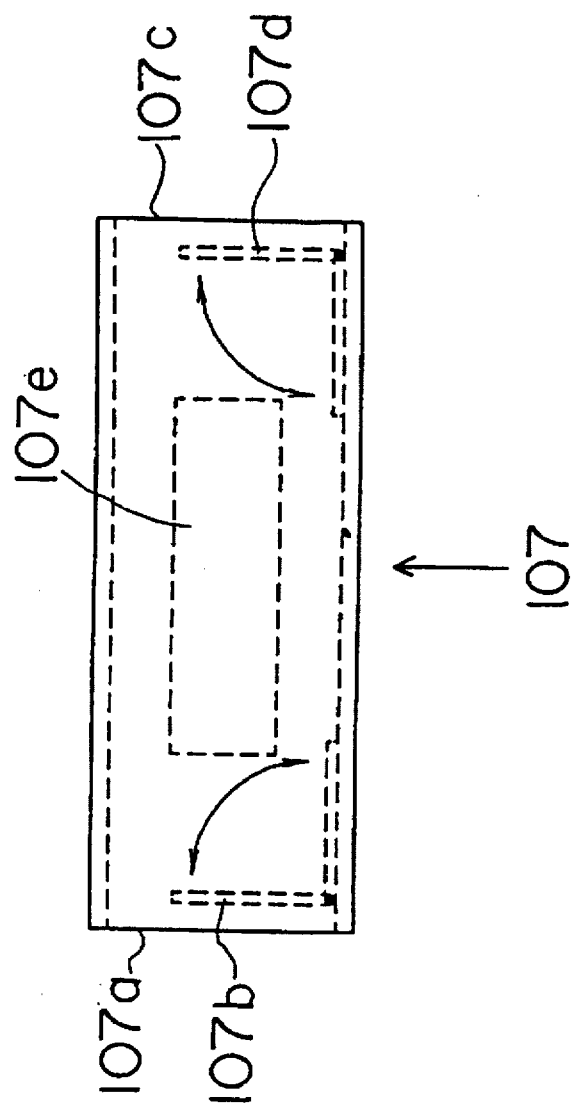
FIG. 11 is a side elevation of the second example of the conventional device for preventing laser beam leakage, which shows the internal construction of an optical adapter.
Figure 12:
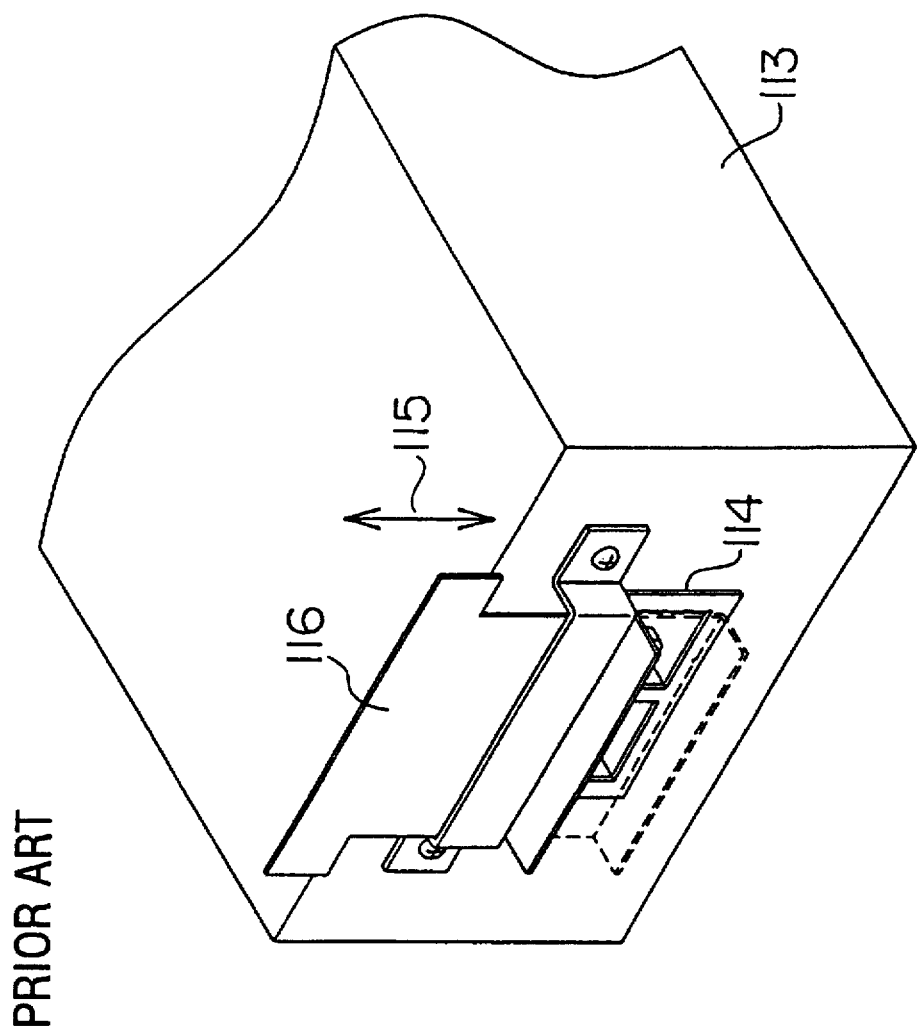
FIG. 12 is a perspective view showing an appearance of a third example of the conventional device for preventing laser beam leakage.
Figure 13:
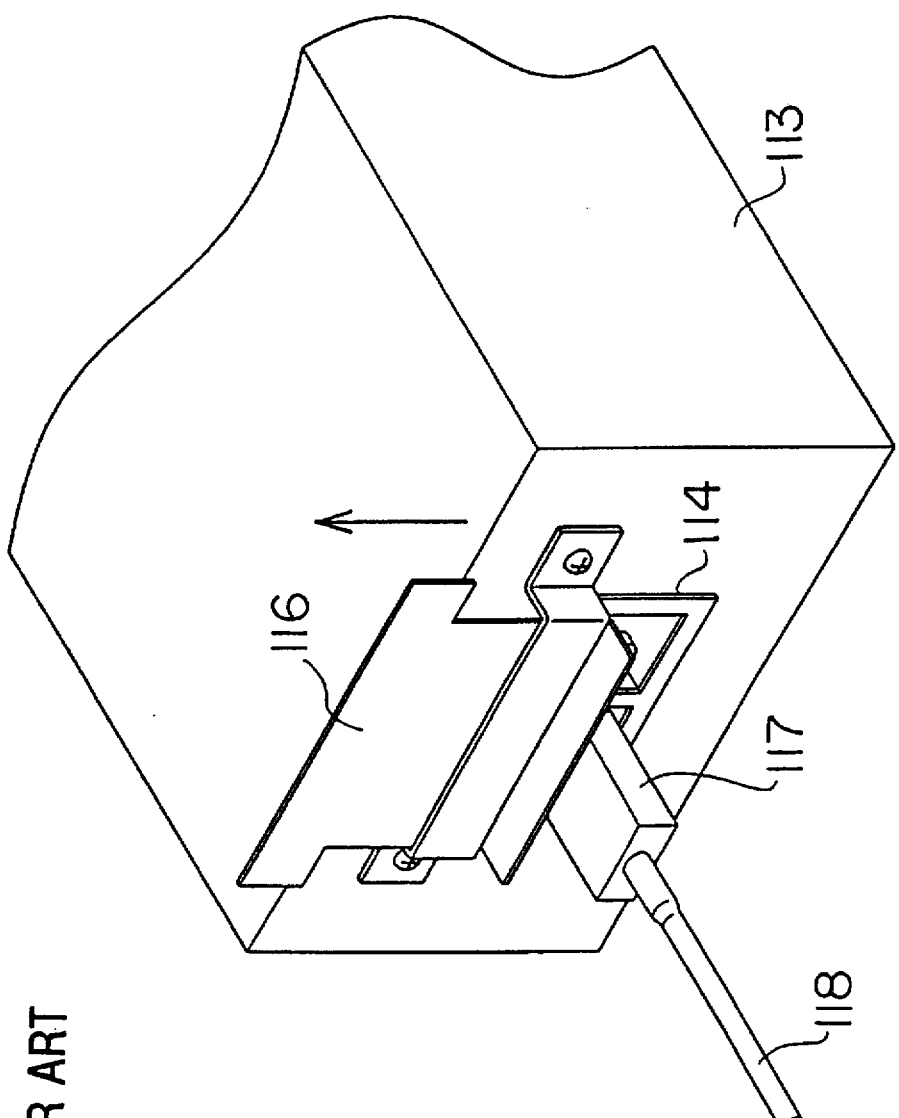
FIG. 13 shows a state of the third example of the conventional device for preventing laser beam leakage in which an external connector is connected to an optical transmission apparatus.

FIG. 5 and FIG. 6 are a perspective view and a side view showing details of the arrangement of the movable shield plates 2b, 2c, respectively. The movable shield plate 2b is provided with sliding portions 2ba, 2bb, while the movable shield plate 2c with sliding portions 2ca, 2cb. (In FIG. 5 and FIG. 6, the sliding portion 2ca is not shown.) Further, the casing of the optical transmission apparatus 1 is provided with guide plates 2d, 2e. These guide plates 2d, 2e are formed on respective opposite sides of the movable shield plates 2b, 2c along the direction of movement of the movable shied plates 2b, 2c. When the movable shield plates 2b, 2c are moved for opening and closing the receiving opening, the sliding portions 2ba, 2bb, 2ca, 2cb slide on the guide plates 2d, 2e. This arrangement ensures tightness of closure of the receiving opening at the sides of the movable shield plates 2b, 2c irrespective of the operative positions thereof.

Further, the open ends of the movable shield plates 2b, 2c which abut on each other when they are in their closing positions are formed with a projection 2bc, and a recess 2cc which engages with the projection 2bc, respectively. This structure enhances the dust-proof properties of the movable shield plates 2bc, 2cc when they are closed.

Next, the operation of the optical transmission apparatus and the device for preventing laser beam leakage arranged as above will be described.

First, when the external connector 7 is not connected to the optical signal connector 2 of the optical transmission apparatus 1, the movable shield plates 2b, 2c are in a closed state by the urging forces of their own resilient properties, and the projection 2bc and the recess 2cc are engaged with each other to secure tightness of closure of the receiving opening, thereby preventing dust from entering the inside of the optical transmission apparatus 1. Further, in this state, the limit switch 14 does not generate the ON signal, so that the E/O laser module 12 is inhibited from delivering the laser beam into the internal optical cable 11.

Next, when the output external connector 7 is connected to the optical signal connector 2 of the optical transmission apparatus 1, the output external connector 7 is first urged against the movable shield plates 2b, 2c. In doing this, since the movable shield plates are arranged such that the curved surfaces formed thereby are indented inward of the casing of the optical transmission apparatus 1, the periphery of the external connector 7 abuts on the movable shield plates 2b, 2c, thereby preventing the cross-sectional surface of the optical fiber provided in the axis of the external connector 7 from being brought into direct contact with movable shield plates 2b, 2c. Therefore, dust deposited on the movable shield plates 2b, 2c are prevented from being attached to the cross-sectional surface of the optical fiber.

When the external connector 7 is urged against the movable shield plates 2b, 2c, these plates 2b, 2c are opened to receive the output external connector 7 into the optical adapter 2a. On this occasion, the movable shield plate 2c turns on the limit switch 14, whereby the ON signal is delivered to the E/O laser module 12. As a result, the E/O laser module 12 starts outputting of the laser beam into the internal optical cable 11, and the optical signal is delivered via the internal connector 9 and the external connector 7 to the external optical cable 6.

Thereafter, when the external connector 7 is removed from the optical signal connector 2 of the optical transmission apparatus 1, first, the limit switch 14 stops delivery of the ON signal, and the E/O laser module 12 inhibits the laser beam from being delivered into the internal optical cable 11. This brings into effect a perfect measure for protection of the eyes of an operator from the laser beam, irrespective of whether the movable shield plates 2b, 2c are open or closed. Further, since the open ends of the movable shield plates 2b, 2c opposite to the retaining ends about which the movable shield plates 2b, 2c rotate are formed with round turn portions, the external connector 7 is not hooked on the open ends of the movable shield plates 2b, 2c, thereby making it possible to remove the external connector 7 smoothly. After the removal of the output external connector 7, the movable shield plates 2b, 2c close the receiving opening by the urging force of their resilient properties, with the projection 2bc and the recess 2cc being engaged with each other to ensure tightness of closure of the receiving opening, thereby preventing dust from entering the inside of the optical transmission apparatus 1.

As described above, the device for preventing laser beam leakage prevents dust from entering the inside of the optical transmission apparatus 1, and further, prevents the laser beam from irradiating the eyes of the operator.

Although in the above embodiment, the limit switch 14 is provided at such a location as will be operated by an opening operation of the movable shield plate 2c, this is not limitative, but the limit switch 14 may be arranged at such a location as will be directly contacted by the output external connector 7 when it is inserted.

Further, the limit switch 14 is not an element essential to the construction of the present invention, and so long as the movable shield plates 2b, 2c are provided, improvements in the dust-proof effects and the effects in prevention of the laser beam leakage can be expected, but perfect protection for the eyes of the operator cannot be expected.

Further, although the present embodiment employs one pair of movable shield plates, this is not limitative, but a plurality of pairs of movable shield plates can be used.

Further, although in the above embodiment, the curved surfaces formed by the movable shield plates 2b, 2c are indented inward of the casing of the optical transmission apparatus 1, this is not limitative, but flat surfaces may be formed in place of the curved surfaces. However, in this case, the cross-sectional surface of the optical fiber can be brought into contact with the movable shield plates 2b, 2c directly so that there is a possibility of attachment of dust deposited on the movable shield plates 2b, 2c to the cross-sectional surface of the optical fiber.

As described above heretofore, according to the present invention, a casing of an optical transmission apparatus is directly provided with at least one pair of shield members constantly urged in respective directions for closing a receiving opening of the casing, and at the same time the shield members has open ends formed with respective joining portions for achieving close contact of each other. Therefore, compared with a conventional device in which an optical adapter is provided with movable shield plates, the device according to the invention has realized improvements in the dust-proof effects and the effects for preventing the laser beam leakage, at a low cost.

Further, by providing the front ends of the shield members with round turn portions, it is possible to remove the external connector smoothly.

Further, provision of the limit switch makes it possible to protect the eyes of an operator from the laser beam perfectly.

Further, since the shield members are not projected out of the casing of the optical transmission apparatus, it is possible to stack a plurality of optical transmission apparatuses one upon another.

Thus, the present invention provides an inexpensive device for preventing laser beam leakage which is excellent in operability and has a high safety.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A device for preventing laser beam leakage provided for a laser beam transmission apparatus in which an external connector is connected to an internal connector, comprising:

a receiving opening formed through a casing of said laser beam transmission apparatus, for receiving said external connector therein; and at least one pair of shield members having respective retaining portions and joining portions, the retaining portions thereof being fixed to said casing of said laser beam transmission apparatus and the joining portions thereof being movably urged together for closing said receiving opening such that said at least one pair of shield members prevent dust from entering the laser beam transmission apparatus through the receiving opening, the joining portions being provided on said at least one pair of shield members opposite to said retaining portions, the joining portions having mating surfaces which are brought into close contact with each other when said at least one pair of shield members are in respective positions for closing said receiving opening.

2. A device for preventing laser beam leakage according to claim 1, wherein said at least one pair of shield members extend into said casing of said laser beam transmission apparatus.

3. A device for preventing laser beam leakage according to claim 1, wherein the mating surface of one of said joining portions includes a projection, and the mating surface of the other of said joining portions includes a recess having a size corresponding to the size of the projection such that when the mating surfaces are brought into close contact the projection fits in the recess.

4. A device for preventing laser beam leakage according to claim 1, wherein the joining portions of said at least one pair of shield members are provided opposite the retaining portions and have curved tips which curved back from mating surfaces toward said retaining portions.

5. A device for preventing laser beam leakage according to claim 1, further comprising:

a switch which is operated by inserting said external connector into said receiving opening to deliver an ON signal;

laser beam supply means for supplying a laser beam to said internal connector; and supply control means connected to said switch and said laser beam supply means, for causing said laser beam supply means to supply said laser beam to said internal connector so long as said supply control means is supplied with said ON signal from said switch.

6. A device for preventing laser beam leakage according to claim 1, wherein the receiving opening has sides on which the retaining portions are fixed and sides on which the retaining portions are not fixed, the device further comprising:

- guide plates provided on the sides of the receiving opening on which the retaining portions are not provided, the guide plates extending into the laser beam transmission apparatus from the casing thereof, the guide plates being spaced an opening distance from one another; and
- sliding portions formed on sides of said at least one pair of shield members, between the retaining portions and the joining portions, the sliding portions together with the shield members having an external width which is substantially the same as the opening distance between the guide plates such that the sliding portions slide on said guide plates.

7. A device for preventing laser beam leakage from a laser beam transmission apparatus having a casing housing an internal connector which receives an external connector, comprising:

- a receiving opening formed in the casing of said laser beam transmission apparatus, the receiving opening being at least large enough to receive the external connector therethrough, the receiving opening having a pair of opposing sides; and
- a pair of shield plates having first and second ends and extending into the casing, the first ends of the shield plates being attached respectively to the pair of opposing sides of the receiving opening, the second ends of the shield plates being movably biased towards one another, the second ends of the shield plates having mating surfaces which mate with one another when the second ends are in contact.

8. A device for preventing laser beam leakage according to claim 7, wherein the mating surface of one shield plate comprises a projection and the mating surface of the other shield plate comprises a recess having a size corresponding to the size of the projection such that when the second ends are in contact, the projection fits in the recess.

9. A device for preventing laser beam leakage according to claim 7, wherein the second ends of the shield plates have curved tips which curve back from the mating surfaces, toward the first ends of the shield plates.

10. A device for preventing laser leakage according to claim 9, wherein upon reception of the external connector, the shield plates separate such that the curved tips move away from one another, to an open position, the device further comprising a switch mechanism provided in the vicinity of the curved tip of one of the shield plates, the switch mechanism being triggered by movement of the curved tip to the open position, to thereby activate a laser when the external connector is received.

11. A device for preventing laser beam leakage according to claim 7, wherein upon reception of the external connector, the shield plates separate such that the second ends of the shield plates move away from one another, to an open position, the device further comprising a switch mechanism provided in the vicinity of the second end of one of the shield plates, the switch mechanism being triggered by movement of the second end to the open position, to thereby activate a laser when the external connector is received.

12. A device for preventing laser beam leakage according to claim 7, wherein the receiving opening has a pair of connecting sides, which connect the opposing sides and form a rectangle-shaped receiving opening together with the opposing sides, the device further comprising:

- a pair of guide plates extending into the casing from the connecting sides, the guide plates being spaced an opening distance from one another; and
- sliding portions formed on the sides of the shield plates, between the first and second ends, the sliding portions together with the shield plates having an external width which is substantially the same as the opening distance between the guide plates such that the sliding portions slide on the guide plates.

* * * * *